(12) United States Patent
Silverman et al.

(10) Patent No.: US 11,533,698 B2
(45) Date of Patent: Dec. 20, 2022

(54) MAPPING METHOD TO COMPENSATE FOR UWB COVERAGE GAPS

(71) Applicant: Cisco Technology, Inc., San Jose, CA (US)

(72) Inventors: Matthew Aaron Silverman, Shaker Heights, OH (US); Jerome Henry, Pittsboro, NC (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 71 days.

(21) Appl. No.: 17/124,020

(22) Filed: Dec. 16, 2020

(65) Prior Publication Data

US 2022/0191814 A1    Jun. 16, 2022

(51) Int. Cl.
*H04W 64/00* (2009.01)
*H04B 1/69* (2011.01)

(52) U.S. Cl.
CPC .............. *H04W 64/00* (2013.01); *H04B 1/69* (2013.01)

(58) Field of Classification Search
CPC ................................. H04W 64/00; H04B 1/69
See application file for complete search history.

(56) References Cited

U.S. PATENT DOCUMENTS

| | | | |
|---|---|---|---|
| 6,941,110 B2 | 9/2005 | Kloper et al. | |
| 8,515,411 B2 | 8/2013 | Sarkar et al. | |
| 8,559,887 B2 | 10/2013 | Stager et al. | |
| 8,776,221 B2 | 7/2014 | Rangarajan et al. | |

(Continued)

FOREIGN PATENT DOCUMENTS

| | | |
|---|---|---|
| CN | 105430767 A | 3/2016 |
| CN | 109348409 A | 2/2019 |

(Continued)

OTHER PUBLICATIONS

Paul Cheong, et al., " An Energy-Efficient Positioning-Enabled MAC Protocol (PMAC) for UWB Sensor Networks," Proceedings of IST mobile and wireless communications summit, 2005, 6 pages.

(Continued)

*Primary Examiner* — Sam K Ahn
*Assistant Examiner* — Amneet Singh
(74) *Attorney, Agent, or Firm* — Edell, Shapiro & Finnan, LLC

(57) ABSTRACT

A computer-implemented method includes first collecting, from wireless devices at known locations in a venue, first ultra wideband (UWB) location measurements obtained using a first location technique based on first UWB transmissions made by a mobile device at a first rate. The method also includes second collecting, from the wireless devices, second UWB location measurements obtained using a second location technique based on second UWB transmissions made by the mobile device at a second rate. The method further includes detecting that the mobile device is in a first UWB coverage hole for the venue with respect to the first UWB location measurements based on a first UWB coverage hole criterion. The method also includes, based on detecting, increasing the second rate relative to the first rate to obtain additional second UWB location measurements using the second location technique to compensate for the first UWB coverage hole.

20 Claims, 14 Drawing Sheets

(56) References Cited

U.S. PATENT DOCUMENTS

| | | |
|---|---|---|
| 9,763,216 B2 | 9/2017 | Sayeed |
| 9,823,330 B2 | 11/2017 | Hart et al. |
| 9,949,083 B1 | 4/2018 | Kirby et al. |
| 9,998,856 B2 | 6/2018 | Edge |
| 10,064,012 B1 | 8/2018 | Boston et al. |
| 11,246,010 B2 | 2/2022 | Mao et al. |
| 11,271,943 B2 | 3/2022 | Urabe et al. |
| 2005/0085190 A1 | 4/2005 | Nishikawa |
| 2008/0101296 A1 | 5/2008 | Palin et al. |
| 2008/0186231 A1 | 8/2008 | Aljadeff et al. |
| 2009/0311960 A1 | 12/2009 | Farahani et al. |
| 2010/0271263 A1 | 10/2010 | Moshfeghi |
| 2013/0138314 A1 | 5/2013 | Vittala et al. |
| 2014/0152437 A1 | 6/2014 | Tian et al. |
| 2015/0156637 A1 | 6/2015 | Li et al. |
| 2015/0289099 A1 | 10/2015 | Marano et al. |
| 2015/0378002 A1 | 12/2015 | Hughes et al. |
| 2016/0178727 A1 | 6/2016 | Bottazzi |
| 2016/0212579 A1 | 7/2016 | Duan et al. |
| 2017/0003374 A1 | 1/2017 | Hehn et al. |
| 2017/0082727 A1 | 3/2017 | Sendonaris et al. |
| 2017/0123039 A1 | 5/2017 | Shin et al. |
| 2017/0123045 A1 | 5/2017 | Shin et al. |
| 2017/0280281 A1 | 9/2017 | Pandey et al. |
| 2017/0356979 A1 | 12/2017 | Georgiou et al. |
| 2018/0310272 A1 | 10/2018 | Younis |
| 2019/0033423 A1 | 1/2019 | Moshreghi |
| 2019/0110227 A1 | 4/2019 | Lepp et al. |
| 2019/0166574 A1 | 5/2019 | Abou-Rizk et al. |
| 2019/0195981 A1 | 6/2019 | Ding et al. |
| 2019/0252064 A1* | 8/2019 | Pipher .................. G16H 40/20 |
| 2019/0349709 A1 | 11/2019 | Kim et al. |
| 2019/0387374 A1 | 12/2019 | Gherardi et al. |
| 2020/0014526 A1 | 1/2020 | Hammerschmidt et al. |
| 2020/0037113 A1 | 1/2020 | Tyagi et al. |
| 2020/0041601 A1 | 2/2020 | Ko et al. |
| 2020/0137676 A1 | 4/2020 | Yoon et al. |
| 2020/0178036 A1 | 6/2020 | Edge |
| 2020/0209341 A1 | 7/2020 | Ylamurto et al. |
| 2020/0228943 A1 | 7/2020 | Martin et al. |
| 2020/0314681 A1 | 10/2020 | Kuo et al. |
| 2021/0352434 A1 | 11/2021 | Harvey et al. |
| 2021/0400441 A1 | 12/2021 | Burowski et al. |

FOREIGN PATENT DOCUMENTS

| | | | |
|---|---|---|---|
| CN | 105430767 B | 4/2019 | |
| CN | 110730422 A | 1/2020 | |
| CN | 210042235 U | 2/2020 | |
| WO | 2015078327 A1 | 6/2015 | |
| WO | WO-2017091792 A1 * | 6/2017 | .............. G01S 1/20 |
| WO | 2019067105 A1 | 4/2019 | |
| WO | 2022025693 A1 | 2/2022 | |

OTHER PUBLICATIONS

Michael Stocker, BSc, "Design of a Decentralized and Synchronous UWB-based Localization System", Graz University of Technology (TU Graz), May 2018, 111 pages.

Sang, Cung Lian et al., "Numerical and Experimental Evaluation of Error Estimation for Two-Way Ranging Methods", www.mdpi.com/journal/sensors, Feb. 1, 2019, 28 pages.

Harnesswalla, Taha, "IEEE 802 15.4a—Understanding the protocol and Reducing Multi-User Interference.", Apr. 9, 2013, 80 pages.

El-Kamchouchi, Hassan Mohamed et al., "Towards a Precise Direction of Arrival Estimation for Coherent Sources Using ECMUSIC", Journal of Electrical and Electronic Engineering vol. 4, Issue 2, http://article.sciencepublishinggroup.com/html/10.11648.j.jeee.20160402.17.html, Apr. 2016, 9 pages.

Xiaojie Zhao et al., "Does BTLE measure up against WiFi? A comparison of indoor location performance", VDE VERLAG GMBH, Berlin, Offenbach, Germany, ISBN 978-3-8007-3621-8, European Wireless 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™—2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15.4a™—2007, Aug. 31, 2007, 203 pages.

\* cited by examiner

MAPPING METHOD TO COMPENSATE FOR UWB COVERAGE GAPS

TECHNICAL FIELD

The present disclosure relates to network equipment and location services.

BACKGROUND

Computing a location of a mobile device in a coverage area or venue based on wireless transmissions from the mobile device may rely on any of a number of different communication technologies and location techniques and that offer a range of location accuracies. For example, ultra-wideband (UWB) location offers better location accuracy than non-UWB location when the mobile device is within range of multiple UWB anchors; however, low power spectral density inherent to UWB limits device-to-device range and generally requires complex control over airtime resources in order to scale in high density. Additionally, the mobile device (or "STA") may not hear all of the anchors all of the time, or detected anchors may all be in the same quadrant of the venue. In this case, ranging to some of the anchors may succeed, but location will generally fail because those anchors may be insufficient to form an adequate location.

DESCRIPTION OF EXAMPLE EMBODIMENTS

Overview

A computer-implemented method includes first collecting, from wireless devices at known locations in a venue, first ultra wideband (UWB) location measurements obtained using a first location technique based on first UWB transmissions made by a mobile device at a first rate. The method also includes second collecting, from the wireless devices, second UWB location measurements obtained using a second location technique based on second UWB transmissions made by the mobile device at a second rate. The method further includes detecting that the mobile device is in a first UWB coverage hole for the venue with respect to the first UWB location measurements based on a first UWB coverage hole criterion. The method also includes, based on detecting, increasing the second rate relative to the first rate to obtain additional second UWB location measurements using the second location technique to compensate for the first UWB coverage hole.

Example Embodiments

UWB location offers better location accuracy than non-UWB location; however, low power spectral density inherent to UWB limits wireless device-to-mobile device range and generally requires deliberate control over airtime resources. Such deliberate control includes: defining which wireless devices engage in two-way ranging (TWR) with each mobile device in a venue; integrating UWB location information across different location techniques to bridge gaps in UWB coverage; and identifying when to use TWR vs. time-difference-of-arrival (TDoA) location. Accordingly, embodiments presented herein detect such gaps in UWB coverage, augment TWR location exchanges with available wireless devices to limit the effect of, or fill-in, the gaps, and combine location measurements across different communication technologies and location techniques to mitigate the gaps.

Figure 1:
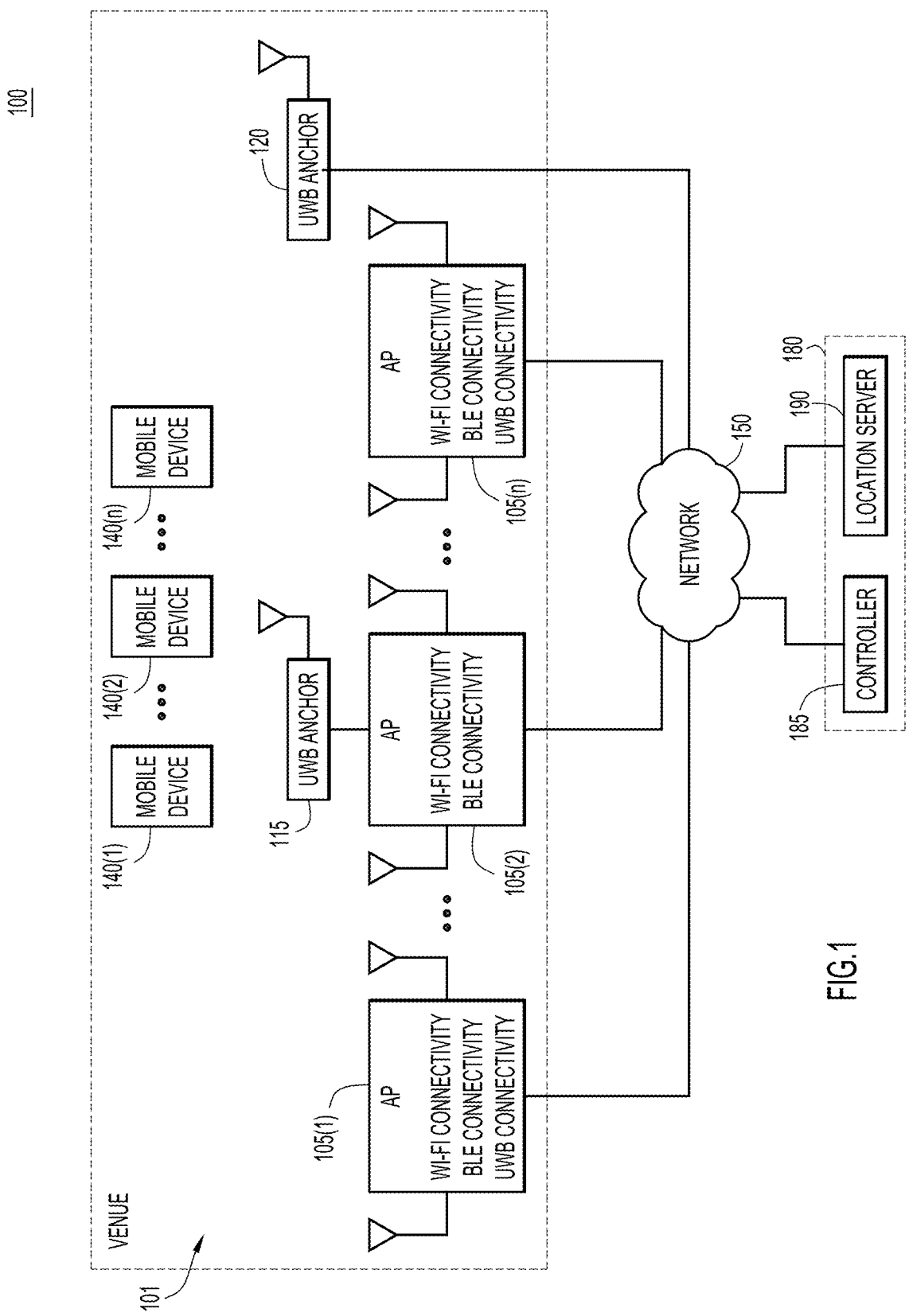
FIG. 1 is a block diagram of a system for compensating for UWB coverage holes in a venue using UWB and non-UWB location measurements for different location techniques, according to an example embodiment.

With reference to FIG. 1, an example system 100 for compensating for UWB coverage holes in a physical space 101 using location techniques that use a mix of UWB and non-UWB location measurements. The location techniques employ or rely on RSSI (based on pathloss models), RSSI fingerprinting, ToF, TWR, fine time measurement (FTM) round trip time (RTT), TDoA, AoA, and the like, to form location solutions with respect to mobile devices based on wireless transmissions from the mobile devices. System 100 includes wireless access points 105 deployed in physical space 101 (referred to in the ensuing description as a "venue 101") and configured to communicate with a plurality of mobile devices 140 in the venue via different wireless communication technologies. The venue 101 may support any density of mobile devices 140, and may include any indoor or outdoor area, such as a home, school, campus, office building, conference center, stadium, or other venue or location or portion thereof. Each of the access points 105 can include any access point or other network device configured to facilitate a connection between one or more mobile devices (such as mobile devices 140) and a network (such as network 150). Access points are sometimes referred to herein as "APs" or "wireless local area network (WLAN) access points."

Access points 105 are positioned at known locations in venue 101, and can communicate with (i.e., send transmissions to, and/or receive transmission from) one or more of the mobile devices 140 using a relatively short-range wireless local area communication technology, such as (but not limited to) wireless personal area network (WPAN), WLAN based on WiFi or any other known or hereafter developed wireless technology/standard suitable for short-range wireless communications for a LAN, Bluetooth Low Energy (BLE), and/or UWB. WPAN is a PAN carried over a low-powered, short-distance wireless network technology such as infrared Data Association (IrDA), wireless Universal Serial Bus (USB), Bluetooth, or ZigBee (IEEE 802.15.4). The reach of a WPAN varies from a few centimeters to a few meters.

For example, access points 105(1) and 105(n) include built-in/integrated WiFi connectivity for communicating with one or more of the mobile devices 140 over WiFi WLAN, WPAN connectivity for communicating with one or more of the mobile devices 140 over WPAN, BLE connectivity for communicating with one or more of the mobile devices 140 over BLE, and UWB connectivity for communicating with one or more of the mobile devices 140 over UWB. Accordingly, with respect to mobile devices 140, access points 105(1) and 105(n) can make UWB, WiFi, and BLE location measurements for location techniques based on UWB, WiFi, and BLE transmissions from the mobile devices, respectively. For example, the access points can make UWB, WiFi, and BLE location measurements for RSSI, ToF, TWR, FTM RTT, TDoA, and AoA location techniques with respect to mobile devices 140. The embodiments presented herein are described primarily with reference to BLE as the Bluetooth technology by way of example only. It is understood that any other Bluetooth technology, or combination of Bluetooth technologies, may be used with the embodiments. Also, as used herein, the term "technology-specific location technique" refers to a location technique (e.g., RSSI location, AoA location, and so on) that uses location measurements based on a specific technology (e.g., UWB, WiFi, BLE). For example, "UWB RSSI location" (or simply "UWB RSSI") refers to RSSI location performed based on UWB RSSI measurements.

Access point 105(2) includes built-in/integrated WiFi connectivity and BLE connectivity but not UWB connectivity. Thus, access point 105(2) can make WiFi and BLE location measurements, but not UWB location measurements. However, access point 105(2) is configured to achieve UWB connectivity via a separate, peripheral UWB anchor device 115 connected to access point 105(2), and positioned at a known location in venue 101. For example, the UWB anchor device 115 can be embodied in a peripheral device connected to access point 105(2) via a USB dongle, a time-synchronized network (TSN) connection, or another connection technology now known or hereinafter developed. UWB anchor device 115 can make UWB location measurements and provide them to access point 105(2).

Each of the mobile devices 140 can include any mobile device or other object capable of over-the-air RF communications utilizing wireless local area communication technologies such as (but not limited to) WiFi WLAN, BLE, and UWB. Each of the mobile devices 140 also may be capable of over-the-air RF communications utilizing one or more wireless wide area communication technologies such as Third Generation Partnership Project (3GPP) communication technologies (e.g., Fourth Generation (4G)/Long Term Evolution (LTE), Fifth Generation (5G), etc.). For example, each of the mobile devices 140 can include a mobile wireless phone, computer, tablet, smart glasses, Augmented Reality tool, an electronic tag (which may, e.g., be coupled to, or associated with, an electronic or non-electronic object), or another device or object now known or hereinafter developed. A mobile device is sometimes referred to herein as a "client" or "station" (STA).

Each of the mobile devices 140 is configured to communicate with one or more of the access points 105. For example, each of the mobile devices 140 may include WiFi WLAN connectivity for communicating with one or more of the access points 105 over WiFi WLAN, BLE connectivity for communicating with one or more of the access points 105 over BLE, and/or UWB connectivity for communicating with one or more of the access points 105 over UWB (either directly or via a peripheral UWB anchor device 115).

The mobile devices 140 also may be configured to communicate over UWB with one or more standalone UWB anchor devices 120 positioned at known locations in space or venue 101. A standalone UWB anchor device 120 includes functionality for receiving (and potentially also sending and/or processing) UWB transmissions without being connected to, or integrated with, an access point 105. Each standalone UWB anchor device 120 also may include other communication capabilities, such as BLE wireless communication capabilities and/or wired communication capabilities, e.g., via a connection to a network (such as network 150) over IEEE 802.11, Ethernet, or another connection mechanism now known or hereinafter developed.

The terms "UWB anchor" and "anchor" are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to an access point 105(2), and/or an access point 105(1) with UWB connectivity. As would be appreciated by a person of ordinary skill in the art, while a UWB anchor can include an access point 105, not all UWB anchors include access points 105, and not all access points 105 constitute UWB anchors.

It should be appreciated that the number, type, and arrangement of the access points 105, mobile devices 140, peripheral UWB anchor devices 115, and standalone UWB anchor devices 120, and their respective connectivity configurations and capabilities, are illustrative and can vary in alternative example embodiments.

The access points 105, peripheral UWB anchor device 115, standalone UWB anchor device 120, and mobile devices 140 are configured to communicate with a control device 180 via a network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location server 190. The controller 185 includes hardware and/or software that is configured to manage operation of the access points 105. For example, the controller 185 may be configured to facilitate certain communications involving one or more of the mobile devices 140 through one or more of the access points 105. In one form, the controller 185 and the location server 190 may be separate and physically distinct entities.

The location server 190 includes hardware and/or software that is configured to manage location-related transmissions involving the access points 105, peripheral UWB anchor device 115, standalone UWB anchor device 120, and/or mobile devices 140. For example, the location server 190 can be configured to cooperate with the access points 105, peripheral UWB anchor device 115, standalone UWB anchor device 120, and/or mobile devices 140 to schedule, initiate, and complete client ranging procedures within the venue 101 that provide location measurements to location solutions, e.g., by assigning and/or instructing one or more of the access points 105, peripheral UWB anchor device 115, and/or standalone UWB anchor device 120 to complete client ranging procedures with respect to one or more of the mobile devices 140.

Location server 190 implements location services that use location measurements that result from the client ranging procedures to compute location solutions for mobile devices. In addition, according to embodiments presented herein, location server 190 manages location-related transmissions and location measurements that result from the location-related transmissions to detect and compensate for UWB coverage holes (also referred to more generally as "coverage holes") in venue 101 related to location techniques that use UWB location measurements.

The location server 190 includes logic for performing location computations using location techniques based on UWB location measurements, non-UWB location measurements, and combinations of both the UWB and non-UWB location measurements. For example, the location server 190 can process time, distance, angle, signal strength or other information from one or more of the access points 105, peripheral UWB anchor devices 115, standalone UWB anchor devices 120, and/or mobile devices 140 to determine and/or track a location of a particular one of the mobile devices 140. The location server 190 can be configured to return results of that processing to the particular one of the mobile devices 140, e.g., through one or more of the access points 105, or to some other entity seeking that location information, if so desired. In addition, or in the alternative, the access points 105, peripheral UWB anchor devices 115, standalone anchor devices 120, and/or mobile devices 140 can be configured to perform certain location computations and, potentially, to report results from those computations to the location server 190.

Though illustrated in FIG. 1 as discrete components, and as explained above, it should be appreciated that the controller 185 and location server 190 may be integrated or otherwise reconfigured in any number of different components without departing from the spirit and scope of the embodiments presented herein.

Figure 2:
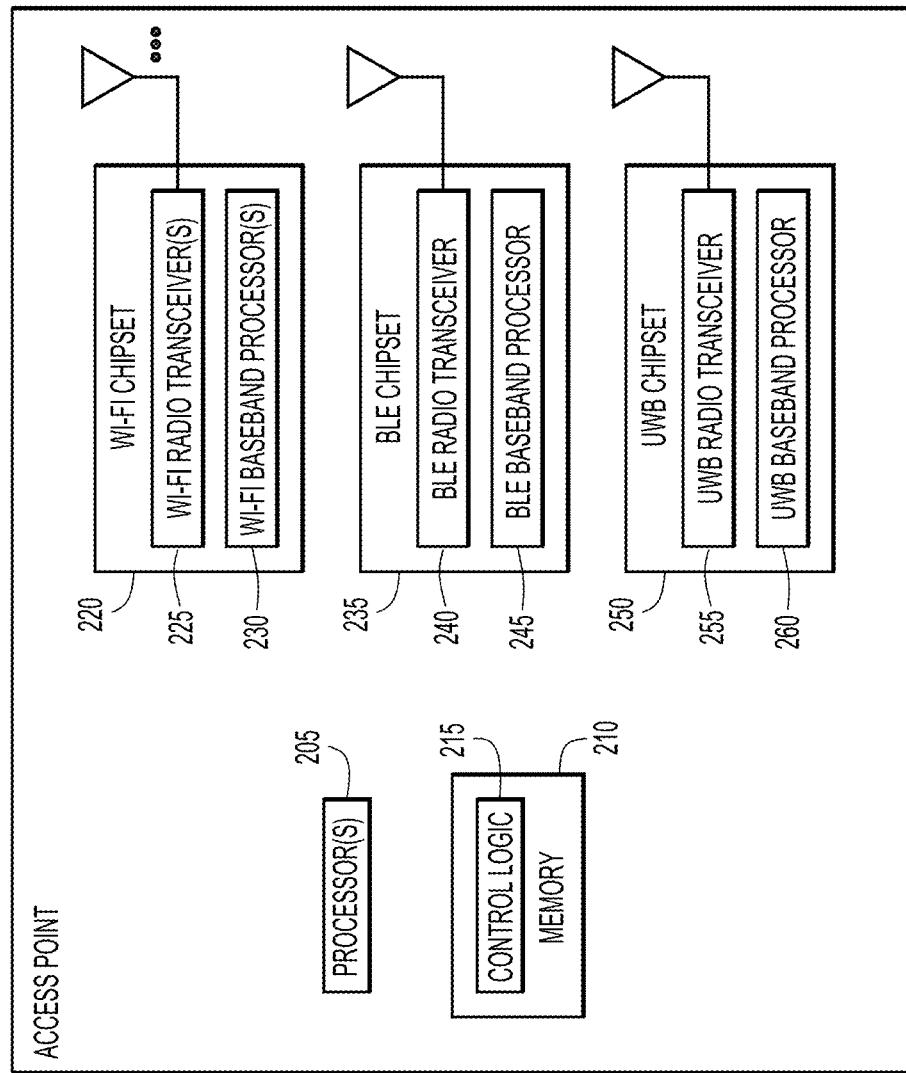
FIG. 2 is a block diagram of a wireless access point of the system, according to an example embodiment.

FIG. 2 is a block diagram of an access point 200, according to an example embodiment. The access point 200 includes a WiFi chipset 220 for providing WiFi connectivity, a BLE chipset 235 for providing BLE connectivity, and a UWB chipset 250 for providing UWB connectivity. The WiFi chipset 220 includes one or more WiFi radio transceivers 225 (e.g., a first non-UWB radio) configured to perform WiFi RF transmission and reception, and one or WiFi baseband processors 230 configured to perform Media Access Control (MAC) and physical layer (PHY) modulation/demodulation processing. The BLE chipset 235 includes a BLE radio transceiver 240 (e.g., a second non-UWB radio) configured to perform BLE RF transmission and reception, and a BLE baseband processor 245 configured to perform BLE baseband modulation and demodulation. The UWB chipset 250 includes a UWB radio transceiver 255 configured to perform UWB RF transmission and reception, and a UWB baseband processor 260 configured to perform UWB baseband modulation and demodulation. For example, the WiFi chipset 220, BLE chipset 235, and UWB chipset 250 may be implemented in one or more application-specific integrated circuits (ASICs), field-programmable gate arrays (FPGAs) or other digital logic embodied in one or more integrated circuits.

The access point 200 includes one or more processors 205, which may embody or include one or more microprocessors and/or microcontrollers. In addition, the access point 200 includes a memory 210 that stores control logic 215. The processor(s) 205 are configured to execute instructions of the control logic 215 to execute various control functions for the access point 200.

As would be understood by a person of ordinary skill in the art, the features and functionality of the access point 200 are illustrative and can vary in alternative example embodiments. For example, the access point 200 may include more, less, or different chipsets in alternative example embodiments. In particular, the access point 200 may not include the WiFi chipset 220 if the access point 200 does not include WiFi connectivity; the access point 200 may not include the BLE chipset 235 if the access point 200 does not include BLE connectivity; and the access point 200 may not include the UWB chipset 250 if the access point 200 does not include UWB connectivity. In addition, as would be recognized by a person of ordinary skill in the art, the access point 200 may include one or more additional components, such as a network interface to provide an IEEE 802.11 connection, Ethernet connection, or other connection, which are not depicted in FIG. 2 for purposes of simplicity.

Figure 3:
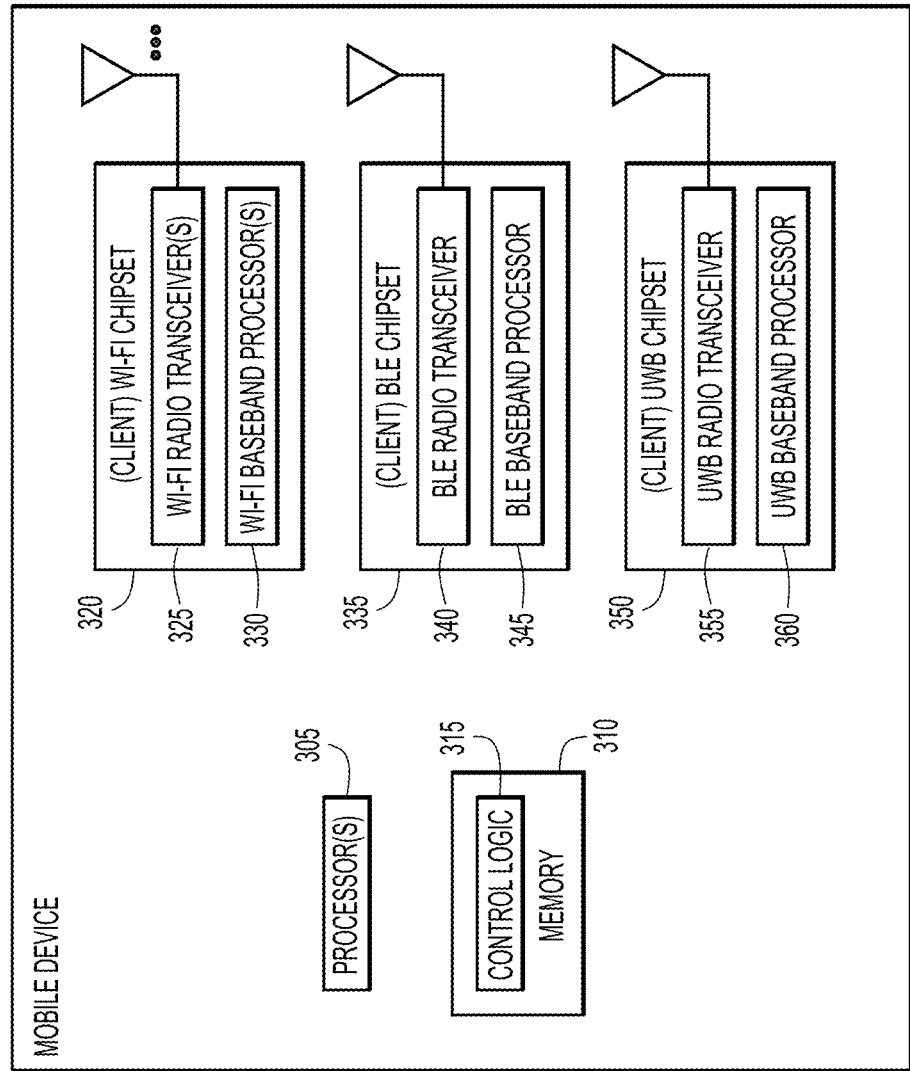
FIG. 3 is a block diagram of a mobile device of the system, according to an example embodiment.

FIG. 3 is a block diagram of a mobile device 300, according to an example embodiment. As would be appreciated by a person of ordinary skill in the art, the mobile device 300 includes chipsets similar to the chipsets of an access point, though with configurations for client-side operations and mobile device/battery-powered use cases. In particular, as with the access point 200 described above in connection with FIG. 2, the mobile device 300 includes a WiFi chipset 320 for providing WiFi connectivity, a BLE chipset 335 for providing BLE connectivity, and a UWB chipset 350 for providing UWB connectivity, with the WiFi chipset 320 including one or more WiFi radio transceivers 325 and one or WiFi baseband processors 330, the BLE chipset 335 including a BLE radio transceiver 340 and a BLE baseband processor 345, and the UWB chipset 350 including a UWB radio transceiver 355 and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the access point 200 depicted in FIG. 2, the mobile device 300 can include more, less, or different components in alternative example embodiments.

Figure 4:
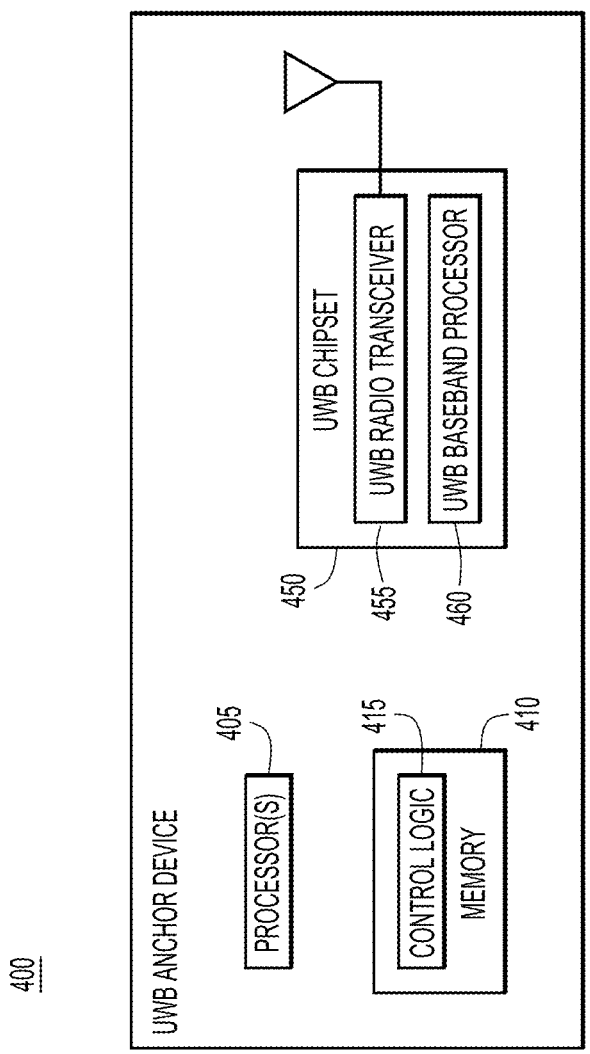
FIG. 4 is a block diagram of a UWB anchor device of the system, according to an example embodiment.

FIG. 4 is a block diagram of a UWB anchor device 400, according to an example embodiment. The UWB anchor device 400 can be, for example, a standalone UWB anchor device or a peripheral UWB anchor device. Accordingly, the UWB anchor device 400 may include some, but not all, of the features depicted in FIGS. 2 and 3 for example access point 200 and mobile device 300, respectively. In particular, while the UWB anchor device 400 includes a UWB chipset 450 (with a UWB radio transceiver 455 and UWB baseband processor 460), as well as one or more processors 405 (e.g., microprocessor(s) and/or microcontroller(s)) and a memory 410 that stores control logic 415, the UWB anchor device 400 does not include a WiFi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, an access point, such as the access point 200, which may include the same or different components than those depicted in the UWB anchor device 400 of FIG. 4.

Embodiments directed to detecting and compensating for UWB coverage holes in venue 101 are described below in connection with FIGS. 5-10. For convenience, in the ensuing description, the access points and anchors described above are referred to more generally as "wireless device(s)."

Figure 5:
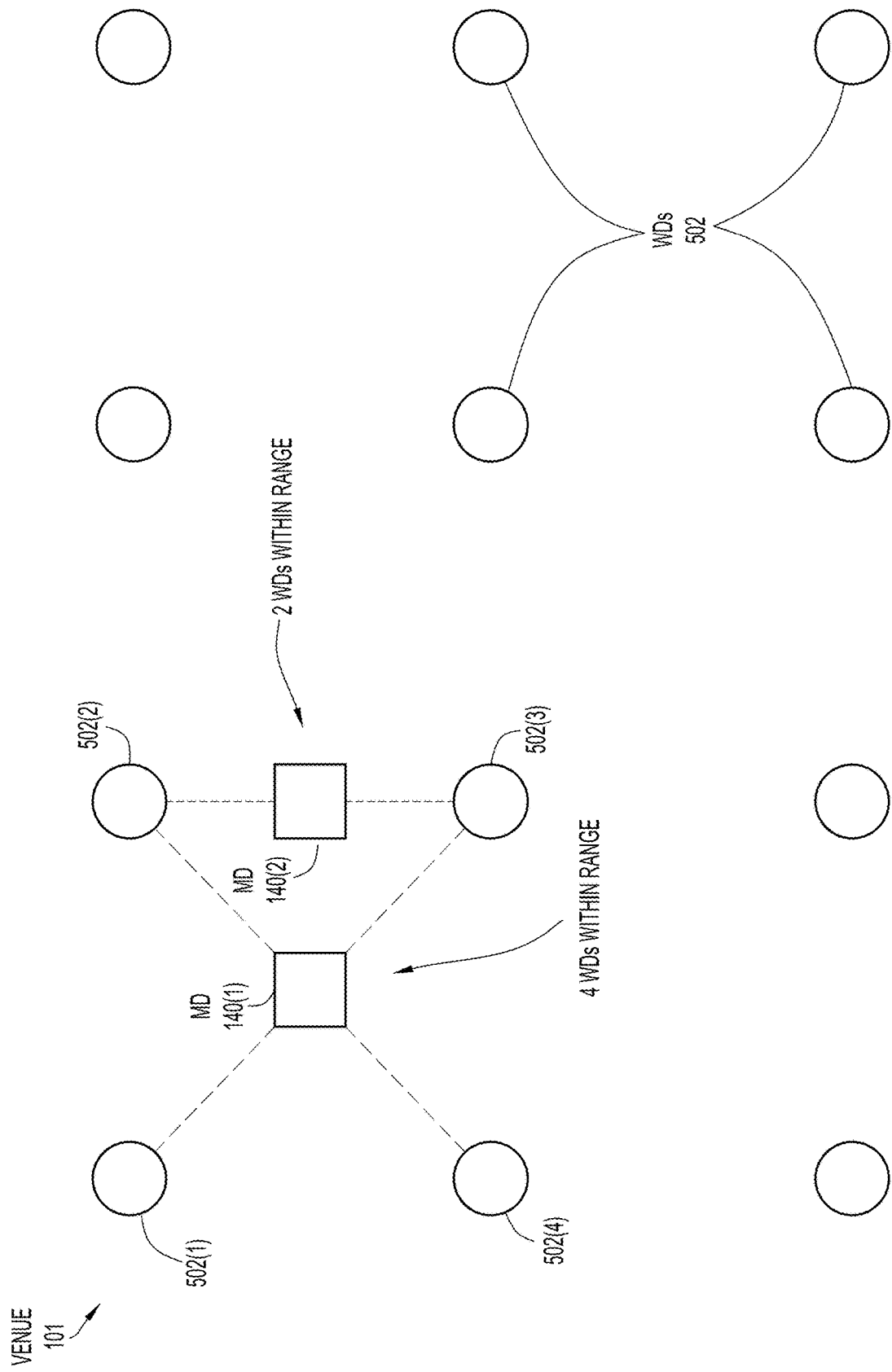
FIG. 5 is an illustration of a floor map of the venue covered by an array of wireless devices (e.g., access points and anchors), and mobile devices amidst the wireless devices, according to an example embodiment.

Turning to FIG. 5, there is an illustration of an example floor map of venue 101. The floor map shows an array of 12 wireless devices (WDs) in FIG. 5 502 (e.g., access points 105 and/or anchors 115, 120) at known locations spanning the venue. Mobile devices (MDs) 140(1) and 140(2) are also shown located amidst the wireless devices. Depending on locations of mobile devices 140(1) and 140(2) relative to their surrounding wireless devices 502, a given mobile device may, or may not, have strong UWB connections to a sufficient number of "reachable" wireless devices, which "hear" UWB transmissions from the given mobile device, to satisfy a given location technique, i.e., to formulate an accurate location solution for the mobile device using UWB location measurements made by the reachable wireless devices based on UWB transmissions from the mobile device.

In the example of FIG. 5, UWB transmissions from mobile device (MD) 140(1) are heard by 4 wireless devices 502(1)-502(4), while UWB transmissions from mobile device 140(2) are only heard by 2 wireless devices 502(2) and 502(3). Assuming that an adequate TDoA location relies on a minimum number of 4 reachable wireless devices, while an adequate TWR location relies on a minimum number of 2 reachable wireless devices, then TDoA location may be used for mobile device 140(1) because it is heard by 4 wireless devices. In contrast, TDoA location cannot be used for mobile device 140(2) because a UWB transmission by the mobile device is only heard by 2 wireless devices. Thus, mobile device 104(2) is said to be in a UWB coverage hole with respect to TDoA. On the other hand, TWR location can be used for mobile device 140(2). Embodiments presented herein detect when a mobile device is in a UWB coverage hole in a venue with respect to a location technique that uses UWB location measurements, and then use various techniques to compensate for, or fill-in, the UWB coverage hole, as described below.

Figure 6:
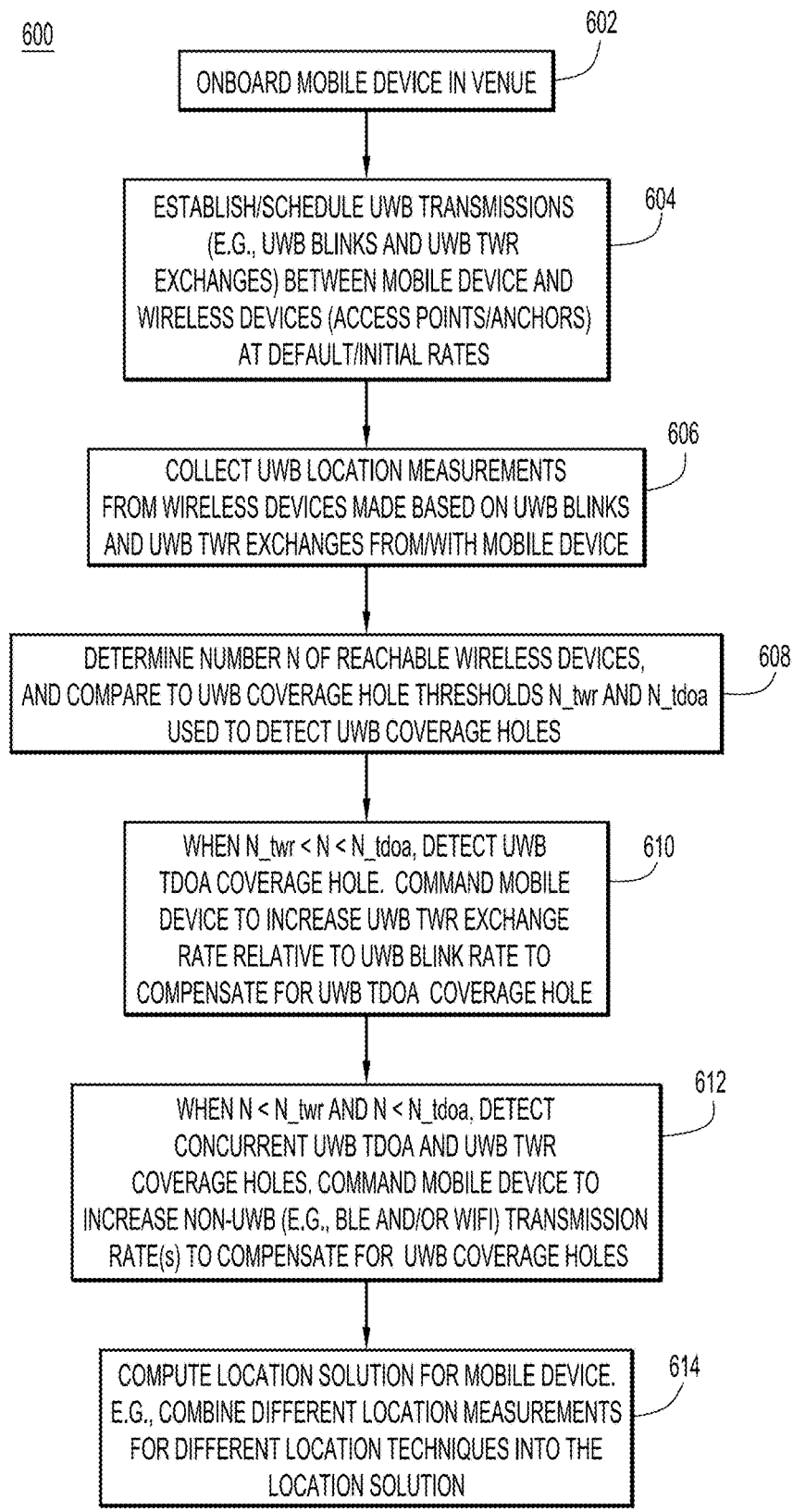
FIG. 6 is a flowchart of a method of detecting and compensating for UWB coverage holes in the venue, according to an example embodiment.

With reference to FIG. 6, there is a flowchart of an example method 600 of detecting and compensating for UWB coverage holes in a venue.

At 602, identifiers (e.g., MAC/IP addresses and/or other identifiers) of wireless devices (e.g., access points and anchors), mapped to their corresponding known locations in venue 101, are stored in a location database accessible to location server 190. The wireless devices connect, and identify themselves, to location server 190. Location server 190 enables non-UWB location services (e.g., WiFi and BLE location services) and UWB location services with respect to venue 101.

A mobile device 140*i* enters venue 101. Mobile device 140*i* begins communicating with the wireless devices and with location server 190 through the wireless devices. The wireless devices and location server 190 cooperate with each other to onboard mobile device 140*i* into system 100. The onboarding process provisions mobile device 140*i* with configuration information to enable the mobile device to access various serving networks associated with venue 101 and the location server.

At 604, the wireless devices and location server 190 cooperate with each other and with mobile device 140*i* to establish and assign to the mobile device a UWB transmission schedule. The UWB transmission schedule sets (i) an initial or default slot/blink period T_blink_default for successive UWB transmissions or "blinks" to be transmitted by mobile device 140*i*, and (ii) a default UWB TWR session/exchange period T_twr_default for successive TWR exchanges between the mobile device and the wireless devices. Each UWB TWR exchange includes a TWR request transmitted by a given wireless device to mobile device 140*i* and, responsive to the request, a TWR response transmitted by the mobile device to the given wireless device.

In another example, mobile device 140*i* may be provisioned/configured to set the default blink period and to trigger blinks, without any interaction with the wireless devices and/or location server 190. Additionally, mobile device 140*i* may determine its own location using precise-timed GPS-like transmissions from the wireless devices and a pre-shared map accessible to the mobile device.

At 606, mobile device 140*i* originates/transmits intermittent UWB transmissions according to the UWB transmission schedule. That is, mobile device 140*i* transmits UWB blinks at a default blink rate corresponding to default blink period T_blink_default (e.g., 1/T_blink_default), and engages in UWB TWR exchanges with the access points at a default TWR exchange rate corresponding to default TWR exchange period T_twr_default (e.g., 1/T_twr_default). Those of the wireless devices within range of mobile device 140*i*, i.e., that can "hear" UWB transmissions from the mobile device, are said to be "reachable" by the mobile device. The reachable wireless devices receive/capture the UWB transmissions, including the UWB blinks and the TWR responses, from mobile device 140*i*.

The reachable wireless devices derive UWB location measurements based on the received UWB transmissions. Non-limiting examples of the UWB location measurements include UWB TDoA measurements based on the UWB blinks, and UWB TWR measurements (e.g., UWB TWR ranging measurements) based on the UWB TWR responses. The wireless devices use their local clocks to timestamp the UWB location measurements with respective timestamps. The wireless devices send to location server 190 UWB location measurement information, e.g., location measurement packets that include the UWB location measurements, their respective timestamps, wireless device identifiers (e.g., access point/UWB anchor identifiers), and a mobile device identifier for mobile device 140*i* (e.g., MAC/IP address or other identifiers) to which the location measurements pertain. Location server 190 collects the location measurement information sent by the wireless devices.

At 608, location server 190 identifies or detects when mobile device 140*i* is located in a UWB coverage hole in venue 101 for a location technique based on the location measurement information. That is, location server 190 detects when there is an insufficient number of reachable wireless devices relative to mobile device 140*i* with respect to a given location technique that uses UWB location measurements. Location server 190 may detect the UWB coverage hole using operations described below.

Location server 190 is provisioned with/stores predetermined threshold information used to detect the UWB coverage hole, including UWB coverage hole thresholds. The UWB coverage hole thresholds include (i) a threshold number N_tdoa (e.g., 4) that represents a minimum number of reachable wireless devices deemed sufficient for an acceptable location solution based solely on TDoA, and (ii) a threshold number N_twr (e.g., 2) that represents a minimum number of reachable wireless devices deemed sufficient for an acceptable location solution based solely on TWR.

Over time, location server 190 monitors/determines a reachable number N of the wireless devices that consistently receive/hear a UWB transmission, e.g., a UWB blink transmission and/or a UWB TWR response, originated by mobile device 140*i*. To do this, location server 190 may track the number of different wireless device identifiers conveyed in the location measurement information corresponding to a given time window.

Location server 190 compares the reachable number N against the two threshold numbers N_tdoa and N_twr, and detects whether mobile device 140*i* is in a UWB coverage hole, or is not in a UWB coverage hole, based on the following comparison results or conditions:
  a. When N>N_twr and N>N_tdoa, the mobile device is considered to not be in any UWB coverage hole.
  b. When N_twr<N<N_tdoa, the mobile device is considered to be in a UWB coverage hole for UWB TDoA, only (i.e., a coverage hole for UWB TDoA, but not for UWB TWR).
  c. When N<N_twr and N<N_tdoa, the mobile device is considered to be in two UWB coverage holes, i.e., a first UWB coverage hole for UWB TDoA and a second UWB coverage hole for UWB TWR.

When location server 190 detects that mobile device 140*i* is in a UWB coverage hole based on the above comparison results, the location server implements a mitigation strategy to compensate for the UWB coverage hole, as follows.

In a first scenario, at 610, when N_twr<N<N_tdoa, location server 190 detects that mobile device 140*i* is in a UWB coverage hole for TDoA, only. In response, location server 190 sends control commands to the wireless devices, and to mobile device 140*i* through the wireless devices, e.g., via UWB (i.e., in-band) or non-UWB (e.g., out-of-band) communications, to request/cause the mobile device to adjust its UWB transmissions in a way that compensates for or fills-in the coverage hole. More specifically, location server 190 requests mobile device 140*i* to (i) increase its UWB blink period (i.e., decrease the UWB blink rate), and, concurrently, (ii) decrease the UWB TWR exchange period (i.e., increase the UWB TWR exchange rate). The amount of decrease in the UWB blink rate may balance the amount of increase in the UWB TWR exchange rate to maintain a constant overall/total UWB transmission rate for mobile device 140*i*, which correspondingly maintains a constant rate for UWB location measurements updates before and after the rate adjustments. In this way, the increase in the UWB TWR exchange rate relative to the UWB blink rate compensates for the UWB TDoA coverage hole.

According to an alternative, or additional, mitigation strategy, location server 190 weights UWB location measurements collected from the wireless devices differently depending on whether the UWB location measurements resulted from either NLOS or LOS UWB transmissions from mobile device 140*i* to the wireless devices. This produces weighted UWB location measurements. Location server 190 can then compute a location solution for mobile device 140*i* based on the weighted UWB location measurements. In an example, a UWB location measurement (e.g., RSSI) derived from a NLOS UWB transmission may be weighted at 0.6, whereas a UWB location measurement (e.g., RSSI) derived from an LOS UWB transmission may be weighted at 1.0.

Another mitigation strategy may be used when mobile device 140*i* employs GPS-like location. In that case, the mobile device may transmit to wireless devices a bitmap (in a payload of a UWB transmission) that indicates all of the wireless devices that the mobile device heard in a previous time period T_anchorPoll. The wireless devices receive the bit map and forward it to location server 190. Upon receiving the bitmap, location server 190 uses the wireless devices identified in the bitmap as a basis for scheduling subsequent UWB TWR exchanges between those wireless devices and mobile device 140*i*.

At 612, in a second scenario, when N<N_twr and N<N_tdoa, location server 190 detects that mobile device 140*i* is in UWB coverage holes for both TDoA and TWR. In response, location server 190 triggers an increase in non-UWB transmissions (e.g., BLE and/or WiFi transmissions) from mobile device 140*i*, to mitigate the UWB coverage holes using non-UWB location measurements. For example, assume that, when the UWB coverage holes are detected, mobile device 140*i* is originating non-UWB transmissions at a non-UWB transmission rate from non-UWB radios of the mobile device. In response, location server 190 sends control commands to mobile device 140*i* through the wireless devices, e.g., via UWB (i.e., in-band) or non-UWB (e.g., out-of-band) communications, to request/cause the mobile device to increase its non-UWB transmission rate. In response, mobile device 140*i* may increase its non-UWB transmission rate, e.g., non-UWB blink rate and non-UWB TWR exchange rate, for a predetermined time period or until the UWB coverage holes are no longer detected. As a result, location server 190 collects correspondingly more non-UWB location measurements from the wireless devices to compensate for the UWB coverage holes.

In a more expansive strategy to mitigate UWB coverage holes, location server 190 computes and tracks locations of many of mobile devices 140 over time based on their UWB transmissions, as the mobile devices enter and move through venue 101. For example, location server 190 computes and tracks the XY locations of the mobile devices on a floor map of venue 101, based on UWB TWR and UWB TDoA. Location server 190 also tracks the number N of wireless devices that hear UWB transmissions from the mobile devices they are at their XY locations, and stores that information. For example, location server 190 may store many tuples of the form <N, XY location> over time, compute statistics from the tuples, and create a map of UWB TWR and UWB TDoA coverage holes in venue 101 based on the statistics.

Then, location server 190 can control UWB transmission scheduling to ensure that wireless devices that are able to reach UWB TDoA coverage holes (i.e., where typically less than N_tdoa wireless devices can observe UWB transmissions from a mobile device) are given airtime priority for UWB TWR exchanges over wireless devices located in areas without UWB TDoA coverage holes. Similarly, location server 190 can control UWB transmission scheduling to ensure areas with UWB TWR coverage holes (i.e., where typically fewer than N_twr wireless devices can hear UWB transmissions from a mobile device) are given the highest priority for UWB TWR exchanges. Such prioritization may be implemented in several ways. One way would be to budget limited numbers of UWB TWR sessions per second and higher budgets for prioritized wireless devices.

At 614, location server 190 computes a location solution for mobile device 140*i* using different location techniques based on the above-described UWB location measurements and/or non-UWB location measurements. In an example, location server 190 combines different types of location measurements for different location techniques into a single combined location solution for mobile device 140*i*, based on considerations/factors described below.

Different location techniques provide different geometries of probability functions for a location of a mobile device. BLE/UWB/WiFi RSSI location probability functions each appear as a circle around each wireless device. A radius of the circle depends on a pathloss model used for location, i.e., an RSSI value translates to a distance based on the pathless model. A TWR probability function appears as a circle around each wireless device that depends on (i) a time of flight between each wireless device and a mobile device being tracked, and (ii) an accuracy with which the mobile device timestamps transmit and receive events/transmissions. A TDoA probability function is generated with respect to 2 wireless devices, and appears as a parabola that traces all spots in a two-dimensional (2D) space, where flight time is given by: $dT=ToF1-ToF2$. An AoA probability function appears as a cone/beam projecting out of a wireless device toward a mobile device being tracked.

The accuracy of each of the different location techniques depends on several factors, as listed below.

For RSSI BLE or WiFi, typical accuracy is within approximately 3-7 m. The accuracy degrades: with distance; when there is error in a pathloss model in an environment; when transmit power of a mobile device is unknown; when multipath is present; for NLOS; and when outside of a convex hull.

For TWR using UWB location measurements, typical ranging accuracy is within approximately 0.5 m. Ranging accuracy degrades slightly with distance, and degrades with NLOS vs LOS.

For WiFi TWR, typical accuracy depends on channel bandwidth (BW), as follows: for 20 MHz, accuracy is approximately 3-5 m for LOS; for 40 MHz, accuracy is within approximately 2-3 m LOS; and for 80 MHz, accuracy is within approximately 1-2 m LOS. In addition, accuracy is heavily impacted by both multipath and by NLOS vs. LOS.

For UWB TDoA, typical accuracy is <1 m with ≥4 wireless devices, and is not defined for a single wireless device. Also, accuracy degrades when outside a convex hull, and when NLOS vs. LOS.

For WiFi AoA or BLE, accuracy degrades with distance, multipath, when outside a convex hull, and as the number of antennas that are sounded are decreased. In addition, accuracy is impacted by antenna polarization vs. incident wave polarization.

Each location measurement for a given location technique described above produces a probability function on a floor map of venue 101 that is specific to the given location technique and all of the factors listed above that degrade performance of the location technique. More specifically, the probability function may be denoted P (k, d, m), where k denotes a technology-specific location technique (e.g., UWB RSSI, UWB AoA, and WiFi RSSI), m represents location measurements (e.g., RSSI and AoA) for the technology-specific location technique k, and d represent factors of the location measurement that lead to degradation for the location technique. The location measurement m and the location technique k define a shape of the probability function in 2D space on the floor map of venue 101, while the degrading factors d and the location technique k define how a sharpness of the probability function.

Considering multiple location measurements across multiple location techniques taken within a timeframe T with respect to a mobile device, the probability that the mobile device is at an XY location is a summation of all of the probabilities across all of the location measurements for all of the location techniques. The highest probability $P_{XY}$ represents a final location solution for the mobile device.

Examples of various probability functions mentioned above are depicted pictorially in gray scale in FIGS. 7A-7D, 8A, and 8B, described below. As depicted, the probability functions include "fuzzy" or blurred features, e.g., circles, that lack sharp edges. It is understood that the blurred features represent actual data, i.e., ranges of values, associated with the probability functions.

Figure 7A:
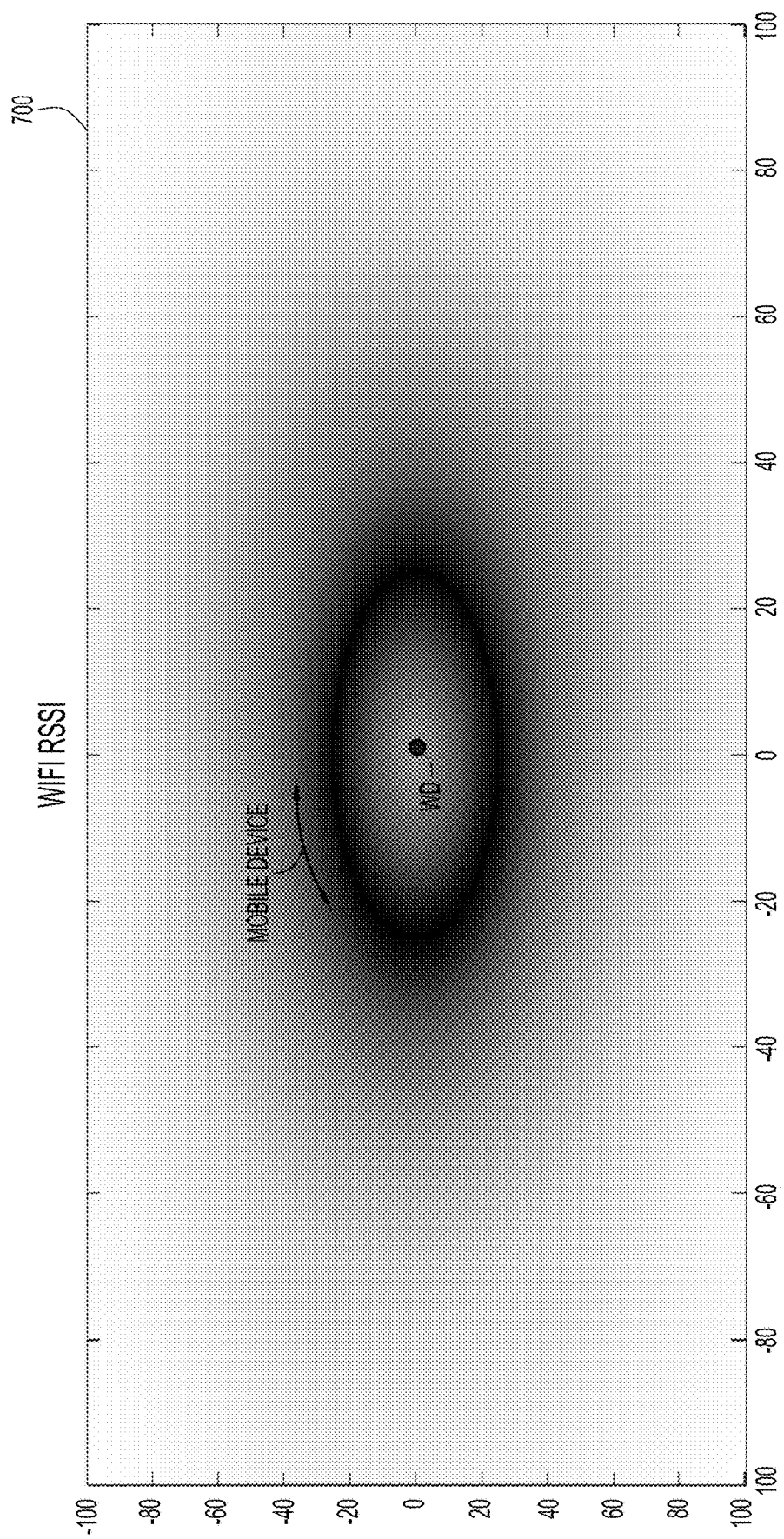
FIGS. 7A-7D are plots of probability functions for a location of a mobile device relative to a wireless device (e.g., access point and/or anchor) using different location techniques, according to example embodiments.

With reference to FIGS. 7A-7D, there are shown example plots of probability functions, superimposed on a 2D floor map of venue 101, for a location of a mobile device relative to a wireless device using different location techniques. FIG. 7A is a plot of an example probability function 700 for WiFi RSSI location. The darker the gray scale, the higher the probability, and vice versa. The probability function represents possible "range" locations of the mobile device relative to the wireless device as a circle surrounding the wireless device. The radius of the circle represents a distance between the mobile device and the wireless device. The thickness or width of the circumference (i.e., the sharpness of the circumference) represents the variance in the distance.

Figure 7B:
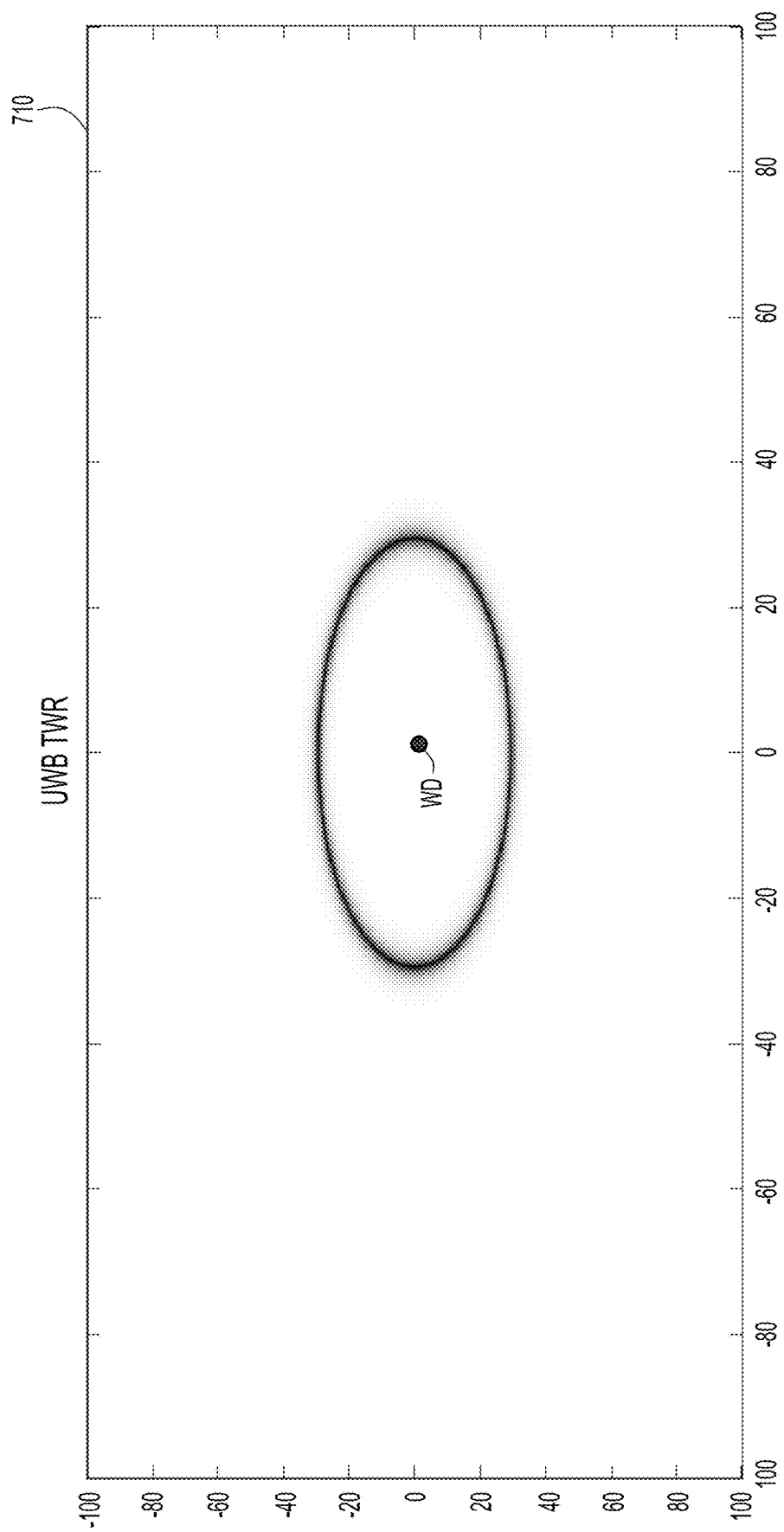

FIG. 7B is a plot of an example probability function 710 for UWB TWR location. Similar to probability function 700, probability function 710 represents possible locations of the mobile device relative to the wireless access point as a circle surrounding the wireless access point. The circle of FIG. 7A has a wider edge than the circle of FIG. 7B because there is more uncertainty in WiFi RSSI location vs. UWB TWR location.

Figure 7C:
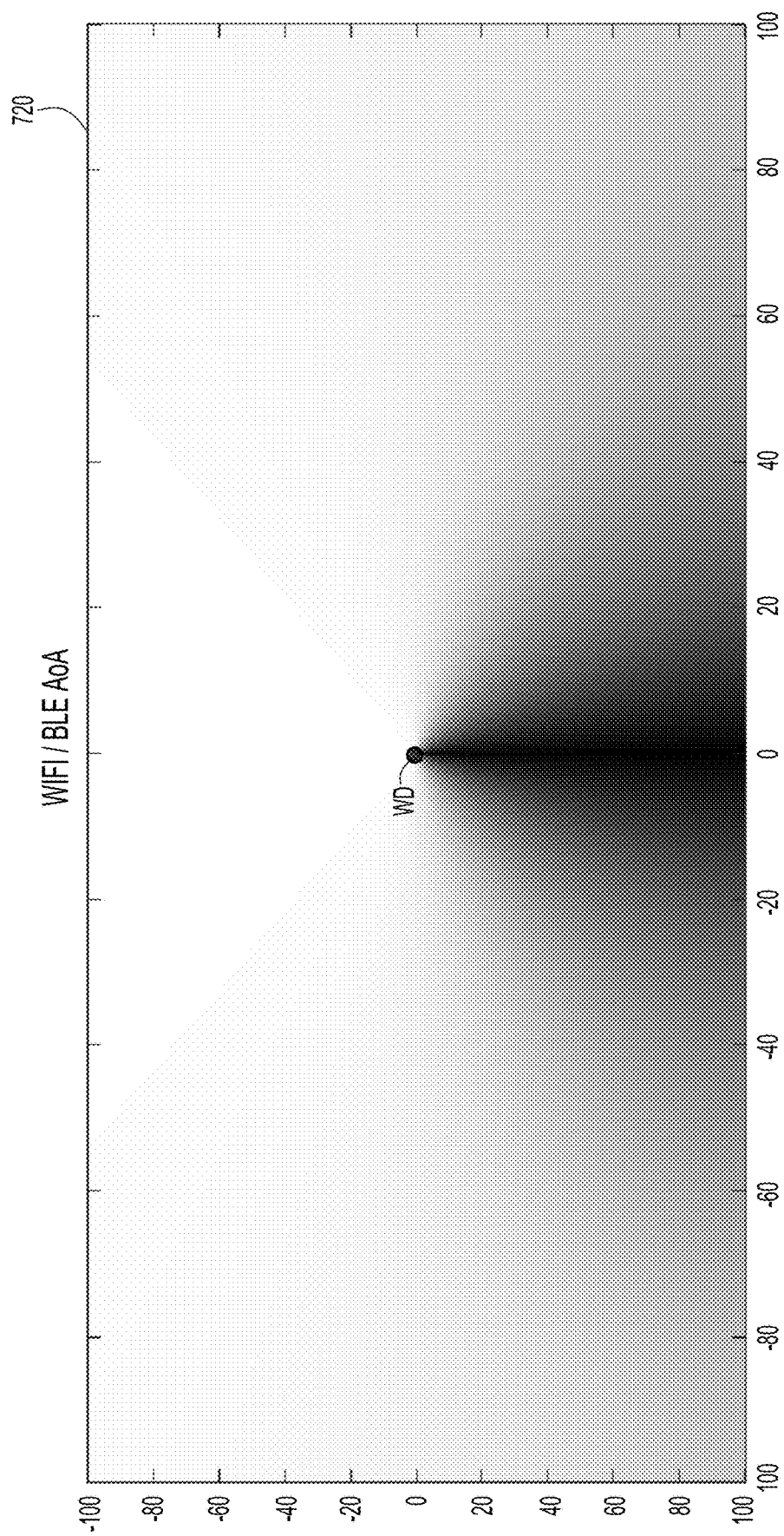

FIG. 7C is a plot of an example probability function 720 for WiFi or BLE AoA. The probability function represents possible angular locations of the mobile device relative to the wireless device as a fan-shaped beam emanating from the wireless device toward the mobile device, e.g., pointing south. A width of the beam represents a variance in the angle.

Figure 7D:
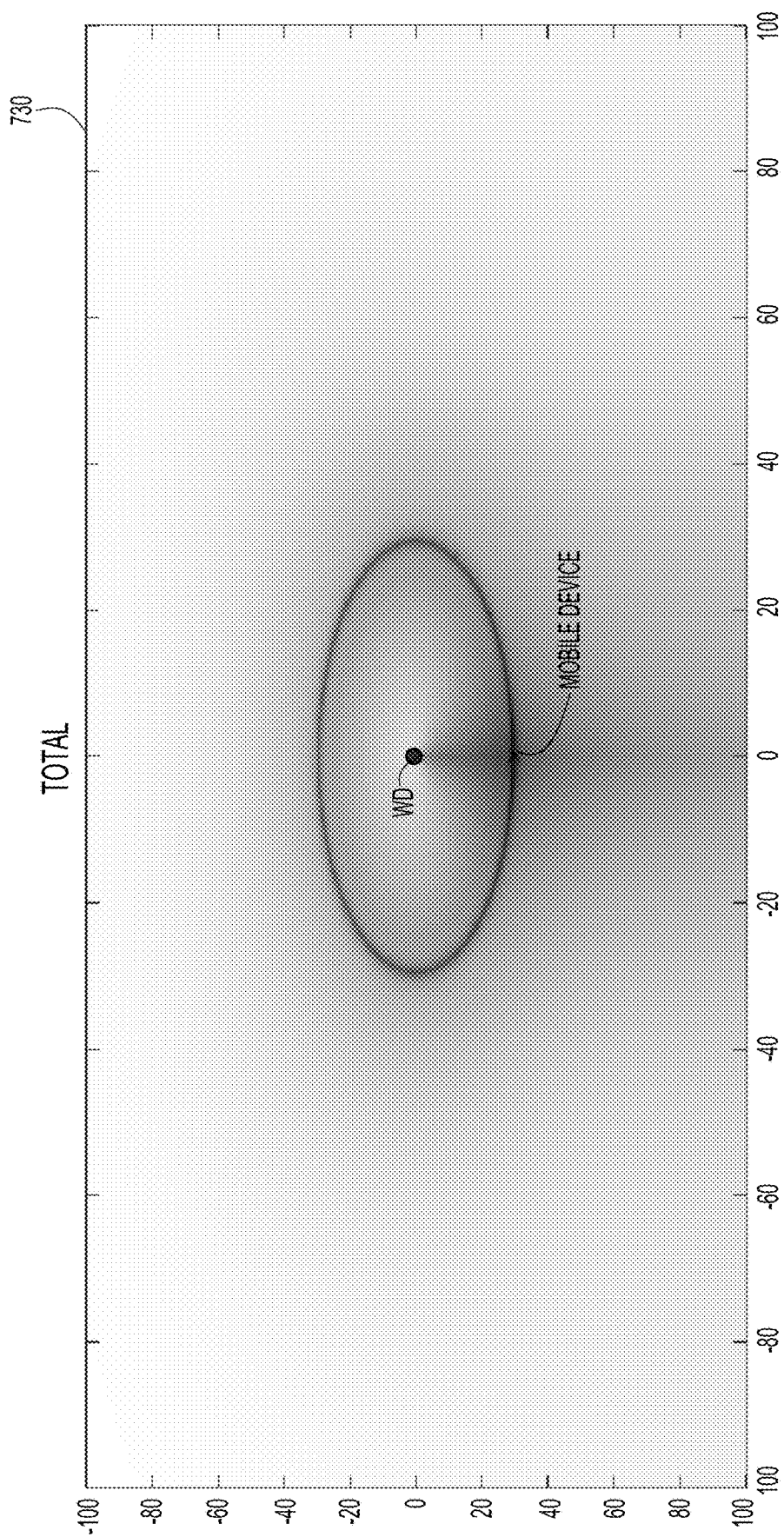

FIG. 7D is a plot of an example total probability function 730 that is a combination of all of the probability functions 700, 710, and 720. Total probability function 730 represents a final location solution for the mobile device that is based on a summation of the probability functions for the different location techniques. For example, location server 190 computes total probability function 730 as a sum of probability functions 700, 710, and 720. Then, location server 190 computes a location solution for the mobile device based on total probability function 730. This represents a location solution that results from combining location measurements for different UWB and/or non-UWB location techniques into the final location solution.

In the absence of probability functions built up over many location measurements, discrete location measurements from different location techniques may also be combined into a combined location solution. For example, location server 190 may (i) compute a total RSSI for a mobile device by summing a weighted UWB RSSI and a weighted WiFi/BLE RSSI, (ii) derive a distance of the mobile device from an anchor by applying the total RSSI to a pathloss model, and (iii) compute a location based on the distance. The location computation may be extended to include UWB and/or WiFi/BLE AoA, and so on.

Figure 8A:
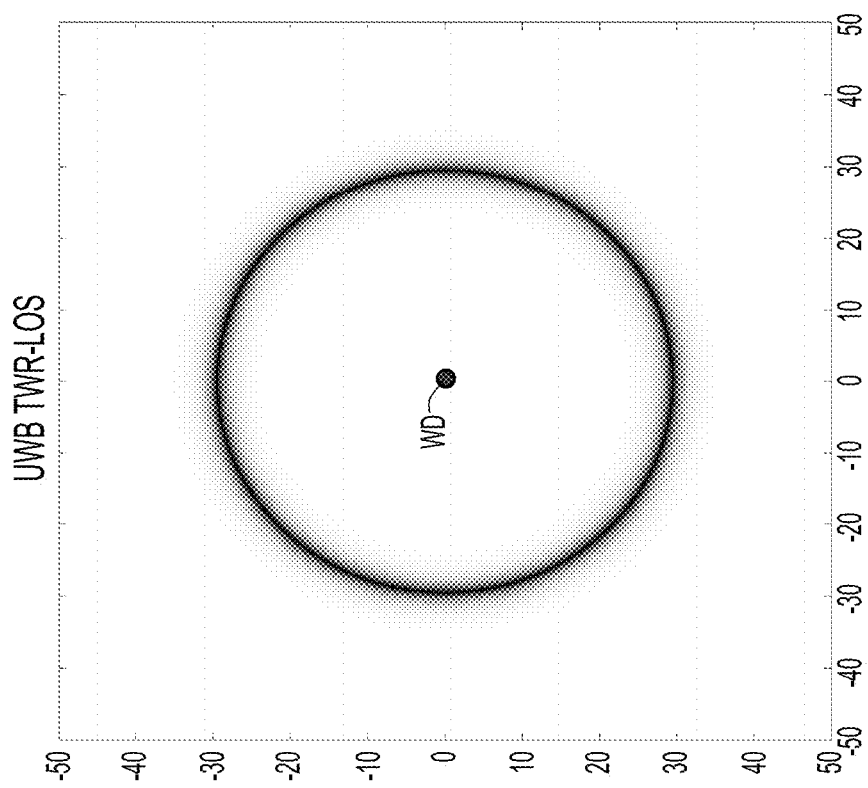
FIGS. 8A and 8B are plots of respective probability functions for a location of a mobile device based on line-of-site (LOS) measurements and non-LOS UWB ranging, according to example embodiments.
Figure 8B:
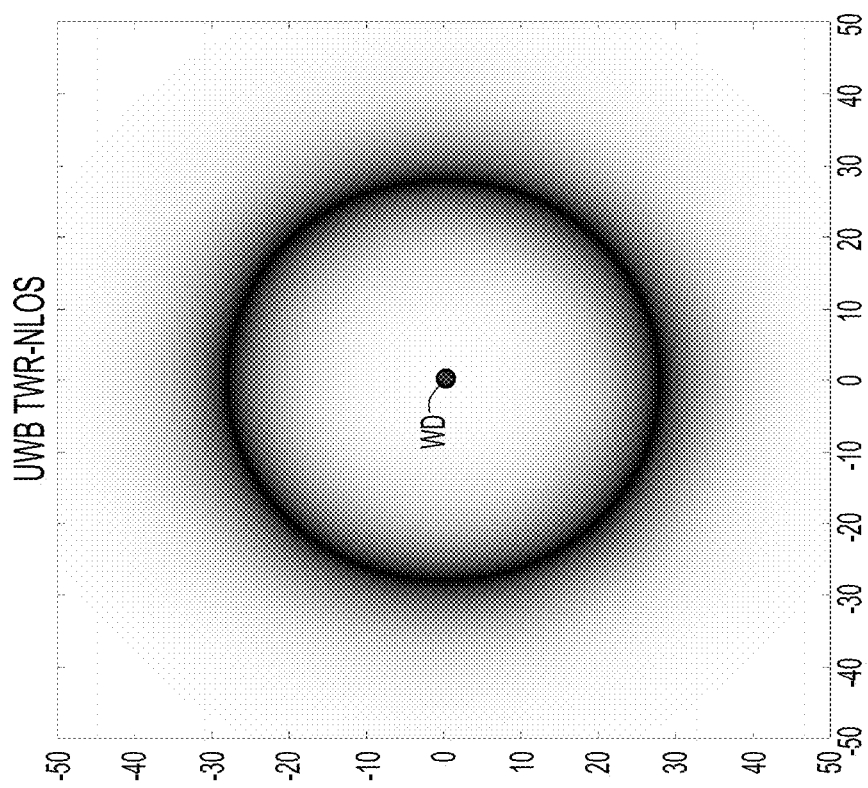

The effect of LOS vs. NLOS measurements on location accuracy are now described in connection with FIGS. 8A and 8B. With reference to FIG. 8A, there is a plot of an example probability function for a location of the mobile device based on LOS measurements for UWB ranging. With reference to FIG. 8B, there is a plot of an example probability function for a location of the mobile device based on NLOS measurements for UWB ranging. The more uncertain NLOS measurements result in the "wider" probability distribution of FIG. 7B, which captures the relatively greater uncertainty introduced by the NLOS measurements.

Figure 9:
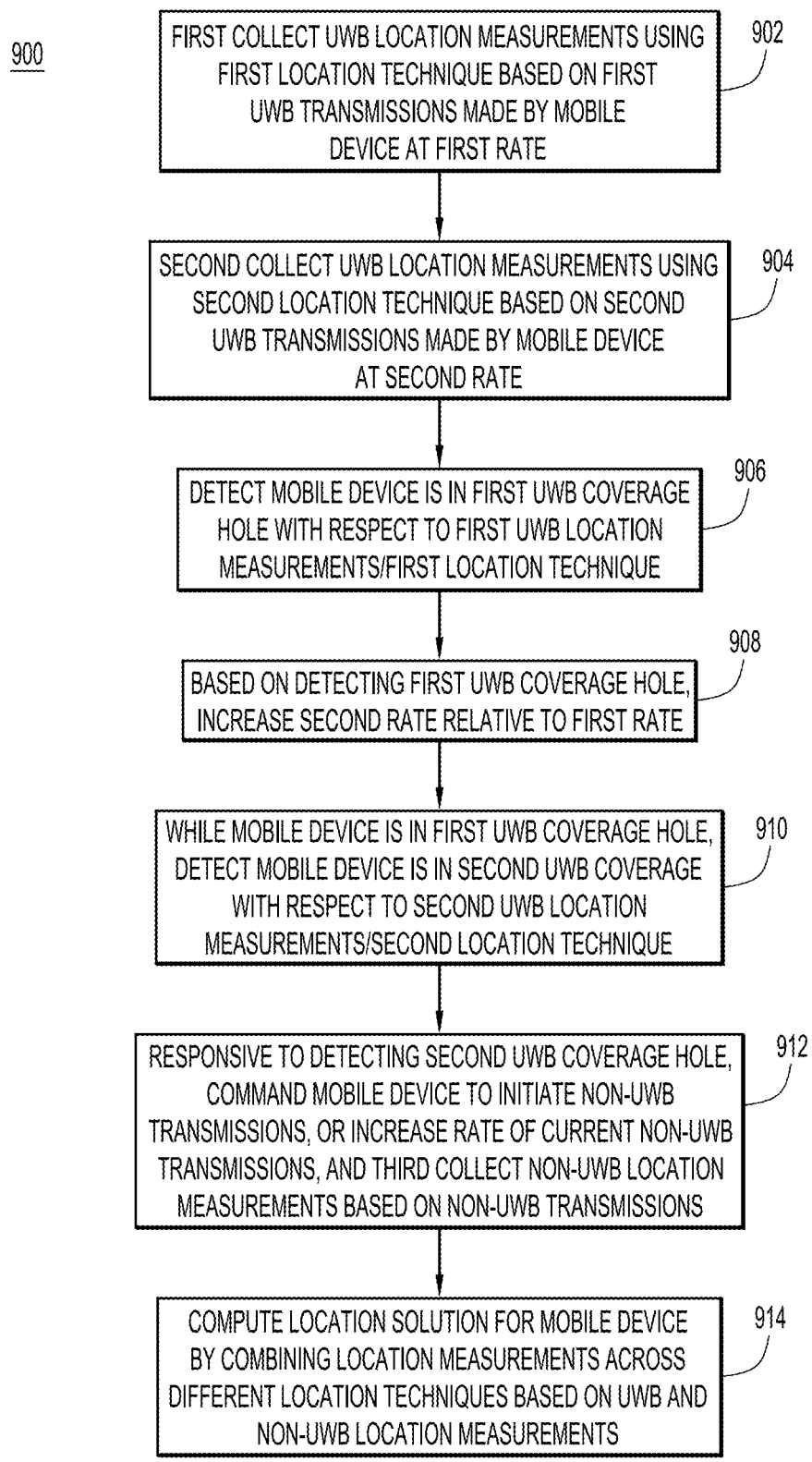
FIG. 9 is a flowchart of a summary method of detecting and compensating for UWB coverage holes in the venue, according to an example embodiment.

With reference to FIG. 9, there is a flowchart of an example summary method 900 of detecting and compensating for UWB coverage holes in a venue. Method 900 includes various operations described above. Method 900 is performed primarily by location server 190, which communicates with wireless devices (e.g., UWB-capable wireless access points and UWB anchors) at fixed, known locations in a venue. The wireless devices are configured to communicate wireless with mobile devices and location server 190.

At 902, location server 190 collects, from the wireless devices, first UWB location measurements (e.g., TDoA measurements) obtained using a first location technique (e.g., TDoA location) based on first UWB transmissions (e.g., UWB blink transmissions) made by a mobile device at a first rate (e.g., a default or initial UWB blink rate).

At 904, location server 190 collects, from the wireless devices, second UWB location measurements (e.g., TWR measurements) obtained using a second location technique (e.g., TWR location) based on second UWB transmissions (e.g., UWB TWR exchanges) made by the mobile device at a second rate (e.g., a UWB TWR exchange rate).

At 906, location server 190 detects that the mobile device is in a first UWB coverage hole for the venue with respect to the first UWB location measurements/first location technique based on a first UWB coverage hole criterion. For example, location server 190 determines a reachable number N of the wireless devices that received one of the first UWB transmissions or one of the second UWB transmissions made by the mobile device, and detects the first UWB coverage hole when the reachable number N is less than a first threshold number (e.g., N_tdoa) of reachable wireless devices deemed sufficient for a location solution for the first location technique. Location server 190 may further detect the first UWB coverage hole when the reachable number N is less than the first threshold number (e.g., N_tdoa) of reachable wireless devices, but greater than a second threshold number (e.g., N_twr) of reachable wireless devices location solution deemed sufficient for a location solution for the second location technique.

At 908, based on detecting the first UWB coverage hole, location server 190 takes actions to cause the mobile device to increases the second rate relative to the first rate, to obtain additional second UWB location measurements using the second UWB location technique to compensate for the first UWB coverage hole. For example, location server 190 sends to the mobile device a message commanding the mobile device to increase the second rate relative to the first rate. Location server 190 may cause the mobile device to (i) increase the second rate from its initial value to a greater value and decrease the first rate from its initial value to a lesser value, (ii) increase the second rate but maintain the second rate constant, or (iii) maintain the second rate constant but decrease the first rate.

At 910, while the mobile device is in the first UWB coverage hole, location server 190 detects that the mobile device is also in a second UWB coverage hole with respect to the second UWB location measurements/second location technique. Thus, the mobile device is in UWB coverage holes with respect to both the first and second UWB location measurements/techniques. To do this, location server 190 may detect that the number N of reachable wireless devices is less than each of the first and second threshold numbers of reachable wireless devices.

At 912, responsive to detecting the second UWB coverage hole, location server 190 sends to the mobile device a message commanding the mobile device to begin transmitting non-UWB transmissions (e.g., Bluetooth transmissions, WPAN transmissions, and/or WLAN transmissions) assuming that the mobile device is not already doing so. Alternatively, when the mobile device is already originating non-UWB transmissions at a non-UWB transmission rate when the second UWB hole is detected, location server 190 sends to the mobile device a message commanding the mobile device to increase the non-UWB transmission rate, to correspondingly increase the rate at which the location server collects the non-UWB location measurements based on the non-UWB transmissions. In either case, location server 190 begins collecting additional non-UWB location measurements for different location techniques from the wireless devices that result from the non-UWB transmissions (i.e., based on the non-UWB transmissions), which compensate for the UWB coverage holes. For example, location server 190 collects Bluetooth location measurements based on Bluetooth transmissions, WPAN location measurements based on WPAN transmissions, and/or WLAN location measurements based on WLAN transmissions.

At 914, location server 190 computes a location solution for the mobile device by combining different types of location measurements for different location techniques into a single combined location solution for the mobile device.

Figure 10:
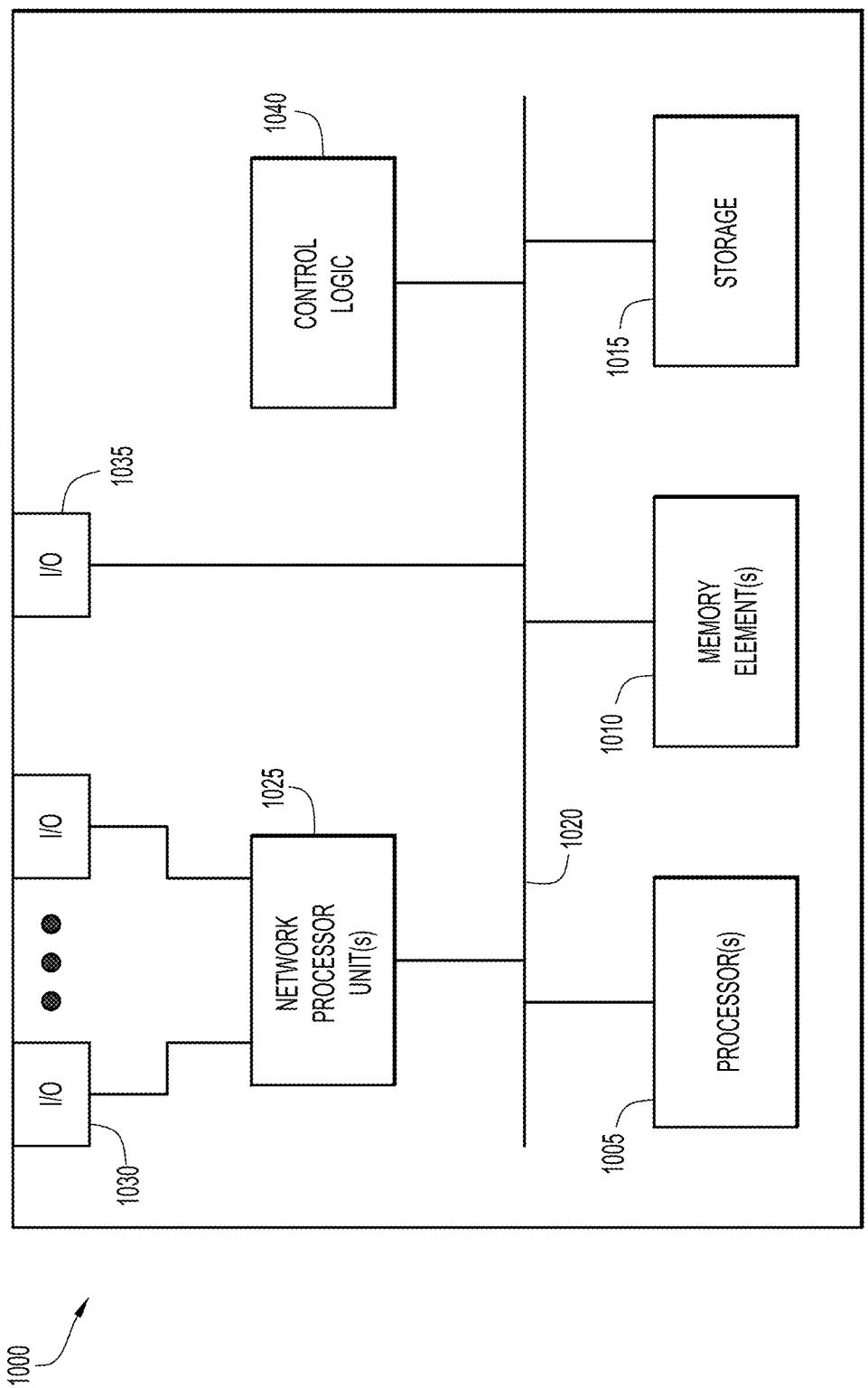
FIG. 10 is a block diagram of a computing device configured to perform operations associated with embodiments described herein, according to an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9, such as controller 185 or location server 190 shown in FIG. 1, in order to perform operations of the various techniques discussed herein.

In at least one embodiment, the computing device 1000 may include one or more processor(s) 1005, one or more memory element(s) 1010, storage 1015, a bus 1020, one or more network processor unit(s) 1025 interconnected with one or more network input/output (I/O) interface(s) 1030, one or more I/O interface(s) 1035, and control logic 1040. In various embodiments, instructions associated with logic for computing device 1000 can overlap in any manner and are not limited to the specific allocation of instructions and/or operations described herein.

In at least one embodiment, processor(s) 1005 is/are at least one hardware processor configured to execute various tasks, operations and/or functions for computing device 1000 as described herein according to software and/or instructions configured for computing device 1000. Processor(s) 1005 (e.g., a hardware processor) can execute any type of instructions associated with data to achieve the operations detailed herein. In one example, processor(s) 1005 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1010 and/or storage 1015 is/are configured to store data, information, software, and/or instructions associated with computing device 1000, and/or logic configured for memory element(s) 1010 and/or storage 1015. For example, any logic described herein (e.g., control logic 1040) can, in various embodiments, be stored for computing device 1000 using any combination of memory element(s) 1010 and/or storage 1015. Note that in some embodiments, storage 1015 can be consolidated with memory element(s) 1010 (or vice versa), or can overlap/exist in any other suitable manner.

In at least one embodiment, bus 1020 can be configured as an interface that enables one or more elements of computing device 1000 to communicate in order to exchange information and/or data. Bus 1020 can be implemented with any architecture designed for passing control, data and/or information between processors, memory elements/storage, peripheral devices, and/or any other hardware and/or software components that may be configured for computing device 1000. In at least one embodiment, bus 1020 may be implemented as a fast kernel-hosted interconnect, potentially using shared memory between processes (e.g., logic), which can enable efficient communication paths between the processes.

In various embodiments, network processor unit(s) 1025 may enable communication between computing device 1000 and other systems, entities, etc., via network I/O interface(s) 1030 to facilitate operations discussed for various embodiments described herein. In various embodiments, network processor unit(s) 1025 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1030 can be configured as one or more Ethernet port(s), Fibre Channel ports, and/or any other I/O port(s) now known or hereafter developed. Thus, the network processor unit(s) 1025 and/or network I/O interface(s) 1030 may include suitable interfaces for receiving, transmitting, and/or otherwise communicating data and/or information in a network environment.

I/O interface(s) 1035 allow for input and output of data and/or information with other entities that may be connected to computer device 1000. For example, I/O interface(s) 1035 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1040 can include instructions that, when executed, cause processor(s) 1005 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1040) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), ASIC, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1010 and/or storage 1015 can store data, software, code, instructions (e.g., processor instructions), logic, parameters, combinations thereof, and/or the like used for operations described herein. This includes memory element(s) 1010 and/or storage 1015 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 1002.11 (e.g., WiFi/WiFi6®), IEEE 1002.16 (e.g., Worldwide Interoperability for Microwave Access (WiMAX)), Radio-Frequency Identification (RFID), Near Field Communication (NFC), Bluetooth, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, embodiments presented herein augment the location accuracy of mid-to-low-precision location techniques (e.g. BLE RSSI based location) by using more accurate ranging techniques on supporting devices (e.g. UWB). Once the training completes, the location of mobile devices that do not support ultra-accurate location (e.g. UWB) is improved by the learning derived from the conclusions derived from the prior combination of low and high accuracy location exchanges.

In one aspect, a computer-implemented method is provided comprising: first collecting, from wireless devices at known locations in a venue, first ultra wideband (UWB) location measurements obtained using a first location technique based on first UWB transmissions made by a mobile device at a first rate; second collecting, from the wireless devices, second UWB location measurements obtained using a second location technique based on second UWB transmissions made by the mobile device at a second rate; detecting that the mobile device is in a first UWB coverage hole for the venue with respect to the first UWB location measurements based on a first UWB coverage hole criterion; and based on detecting, increasing the second rate relative to the first rate to obtain additional second UWB location measurements using the second location technique to compensate for the first UWB coverage hole.

In another aspect, an apparatus is provided comprising: a network processor unit coupled to network input/output interfaces to communicate with a network; and a processor coupled to the network processor unit and configured to perform: first collecting, from wireless devices at known locations in a venue, first ultra wideband (UWB) location measurements obtained using a first location technique based on first UWB transmissions made by a mobile device at a first rate; second collecting, from the wireless devices, second UWB location measurements obtained using a second location technique based on second UWB transmissions made by the mobile device at a second rate; detecting that the mobile device is in a first UWB coverage hole for the venue with respect to the first UWB location measurements based on a first UWB coverage hole criterion; and based on detecting, increasing the second rate relative to the first rate to obtain additional second UWB location measurements using the second location technique to compensate for the first UWB coverage hole.

In yet another aspect, a non-transitory computer readable medium is provided. The computer readable medium is encoded with instructions that, when executed by a processor, cause the processor to perform: first collecting, from wireless devices at known locations in a venue, first ultra wideband (UWB) location measurements obtained using a first location technique based on first UWB transmissions made by a mobile device at a first rate; second collecting, from the wireless devices, second UWB location measurements obtained using a second location technique based on second UWB transmissions made by the mobile device at a second rate; detecting that the mobile device is in a first UWB coverage hole for the venue with respect to the first UWB location measurements based on a first UWB coverage hole criterion; and based on detecting, increasing the second rate relative to the first rate to obtain additional second UWB location measurements using the second location technique to compensate for the first UWB coverage hole.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   first collecting, from wireless devices at known locations in a venue, first ultra wideband (UWB) location measurements obtained using a first location technique based on first UWB transmissions made by a mobile device at a first rate;
   second collecting, from the wireless devices, second UWB location measurements obtained using a second location technique based on second UWB transmissions made by the mobile device at a second rate;
   determining a reachable number of the wireless devices that received one of the first UWB transmissions or one of the second UWB transmissions made by the mobile device;
   detecting that the mobile device is in a first UWB coverage hole for the venue with respect to the first UWB location measurements when the reachable number is less than a first threshold number of the wireless devices deemed sufficient for a location solution based on the first UWB location measurements; and
   based on the detecting, increasing the second rate relative to the first rate to obtain additional second UWB location measurements using the second location technique to compensate for the first UWB coverage hole.

2. The computer-implemented method of claim 1, further comprising:
   computing the location solution for the mobile device based on the first UWB location measurements and the second UWB location measurements.

3. The computer-implemented method of claim 1, further comprising:
   based on the detecting, sending to the mobile device a message commanding the mobile device to perform increasing the second rate relative to the first rate.

4. The computer-implemented method of claim 1, wherein:
   the first collecting includes collecting time-difference-of-arrival (TDoA) measurements based on UWB transmissions by the mobile device at the first rate.

5. The computer-implemented method of claim 4, wherein:
   the second collecting includes collecting two-way-ranging (TWR) measurements based on exchanges between the wireless devices and the mobile device performed at the second rate.

6. The computer-implemented method of claim 1, wherein:
   the first UWB location measurements include line-of-site (LOS) or non-LOS (NLOS) measurements.

7. The computer-implemented method of claim 1, wherein:
the detecting further includes detecting that the mobile device is in the first UWB coverage hole when the reachable number is less than the first threshold number of the wireless devices, but greater than a second threshold number of the wireless devices deemed sufficient for the location solution based on the second UWB location measurements.

8. The computer-implemented method of claim 1, further comprising:
while the mobile device is in the first UWB coverage hole, detecting that the mobile device is in a second UWB coverage hole for the venue with respect to the second UWB location measurements; and
based on detecting that the mobile device is in the second UWB coverage hole, third collecting, from the wireless devices, non-UWB location measurements obtained using one or more location techniques based on non-UWB transmissions made by the mobile device, to compensate for the first UWB coverage hole and the second UWB coverage hole.

9. The computer-implemented method of claim 8, further comprising:
prior to the detecting the mobile device is in the second UWB coverage hole, collecting non-UWB location measurements based on non-UWB transmissions made by the mobile device at a third rate; and
based on detecting the mobile device is in the second UWB coverage hole, increasing the third rate to obtain additional non-UWB location measurements via the third collecting.

10. The computer-implemented method of claim 8, wherein:
the third collecting includes collecting one or more of wireless personal area network (WPAN) location measurements based on WPAN transmissions made by the mobile device, and wireless local area network (WLAN) location measurements based on WLAN transmissions made by the mobile device.

11. The computer-implemented method of claim 1, wherein the wireless devices include UWB-capable wireless access points and UWB anchors.

12. An apparatus comprising:
a network processor unit coupled to network input/output interfaces to communicate with a network; and
a processor coupled to the network processor unit and configured to perform:
first collecting, from wireless devices at known locations in a venue, first ultra wideband (UWB) location measurements obtained using a first location technique based on first UWB transmissions made by a mobile device at a first rate;
second collecting, from the wireless devices, second UWB location measurements obtained using a second location technique based on second UWB transmissions made by the mobile device at a second rate;
determining a reachable number of the wireless devices that received one of the first UWB transmissions or one of the second UWB transmissions made by the mobile device;
detecting that the mobile device is in a first UWB coverage hole for the venue with respect to the first UWB location measurements when the reachable number is less than a first threshold number of the wireless devices deemed sufficient for a location solution based on the first UWB location measurements; and
based on the detecting, increasing the second rate relative to the first rate to obtain additional second UWB location measurements using the second location technique to compensate for the first UWB coverage hole.

13. The apparatus of claim 12, wherein the processor is further configured to perform:
computing the location solution for the mobile device based on the first UWB location measurements and the second UWB location measurements.

14. The apparatus of claim 12, wherein:
the processor is configured to perform the first collecting by collecting time-difference-of-arrival (TDoA) measurements based on UWB transmissions by the mobile device at the first rate.

15. The apparatus of claim 14, wherein:
the processor is configured to perform the second collecting by collecting two-way-ranging (TWR) measurements based on exchanges between the wireless devices and the mobile device performed at the second rate.

16. The apparatus of claim 12, wherein:
the first UWB location measurements include line-of-site (LOS) or non-LOS (NLOS) measurements.

17. The apparatus of claim 12, wherein the processor is further configured to perform:
while the mobile device is in the first UWB coverage hole, detecting that the mobile device is in a second UWB coverage hole for the venue with respect to the second UWB location measurements; and
based on detecting that the mobile device is in the second UWB coverage hole, third collecting, from the wireless devices, non-UWB location measurements obtained using one or more location techniques based on non-UWB transmissions made by the mobile device, to compensate for the first UWB coverage hole and the second UWB coverage hole.

18. A non-transitory computer readable medium encoded with instructions that, when executed by a processor, cause the processor to perform:
first collecting, from wireless devices at known locations in a venue, first ultra wideband (UWB) location measurements obtained using a first location technique based on first UWB transmissions made by a mobile device at a first rate;
second collecting, from the wireless devices, second UWB location measurements obtained using a second location technique based on second UWB transmissions made by the mobile device at a second rate;
detecting that the mobile device is in a first UWB coverage hole for the venue with respect to the first UWB location measurements based on a first UWB coverage hole criterion;
based on the detecting, increasing the second rate relative to the first rate to obtain additional second UWB location measurements using the second location technique to compensate for the first UWB coverage hole;
while the mobile device is in the first UWB coverage hole, detecting that the mobile device is in a second UWB coverage hole for the venue with respect to the second UWB location measurements; and
based on detecting that the mobile device is in the second UWB coverage hole, third collecting, from the wireless devices, non-UWB location measurements obtained using one or more location techniques based on non-UWB transmissions made by the mobile device, to compensate for the first UWB coverage hole and the second UWB coverage hole.

19. The non-transitory computer readable medium of claim 18, wherein:
the first collecting includes collecting time-difference-of-arrival (TDoA) measurements based on UWB transmissions by the mobile device at the first rate.

20. The non-transitory computer readable medium of claim 19, wherein:
the second collecting includes collecting two-way-ranging (TWR) measurements based on exchanges between the wireless devices and the mobile device performed at the second rate.

* * * * *